J. A. CAMERON AND G. B. BIRCH.
SLITTING MEANS.
APPLICATION FILED JUNE 9, 1920.

1,355,104.

Patented Oct. 5, 1920.
2 SHEETS—SHEET 1.

Inventors
James A. Cameron
Gustaf B. Birch
By their Attorney

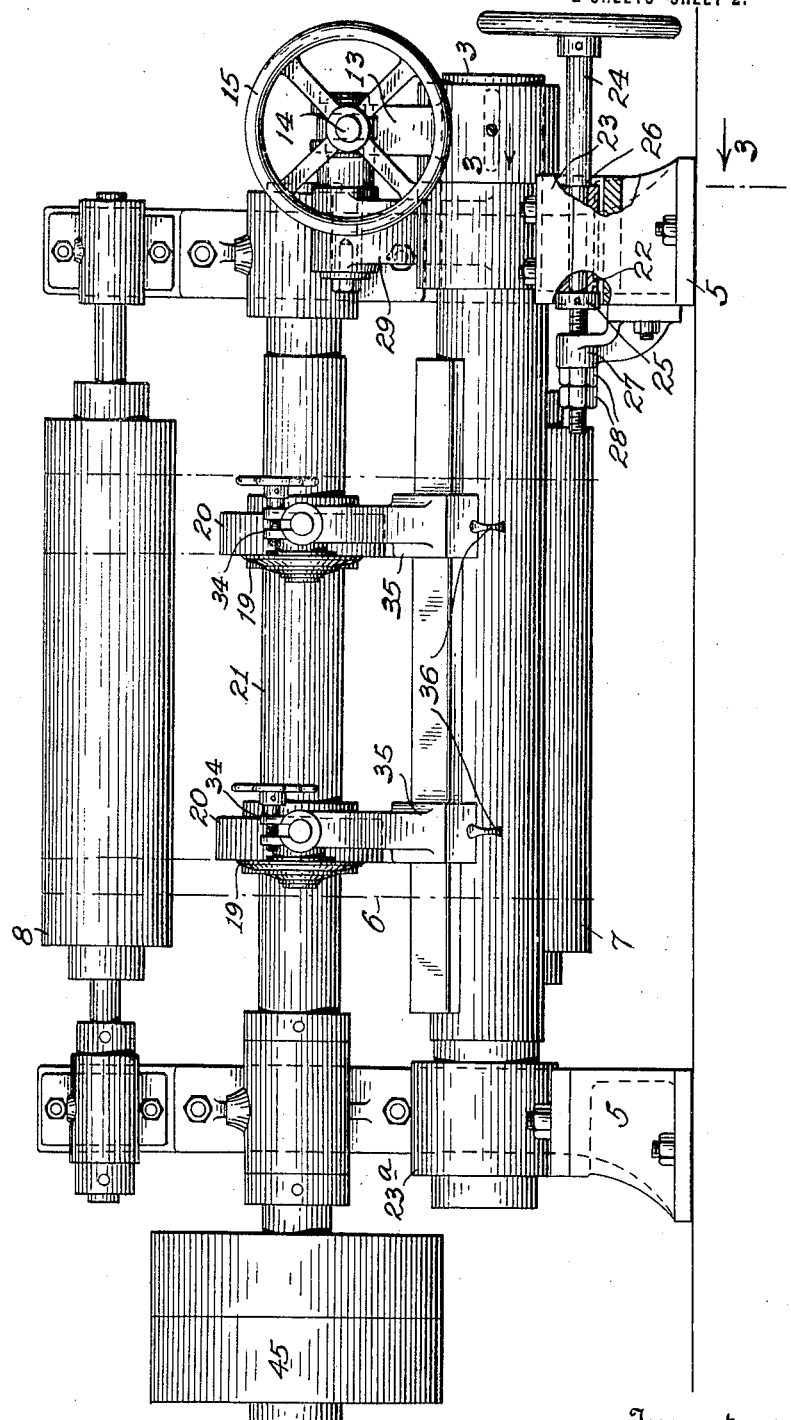

UNITED STATES PATENT OFFICE.

JAMES A. CAMERON AND GUSTAF BIRGER BIRCH, OF BROOKLYN, NEW YORK, ASSIGNORS TO CAMERON MACHINE COMPANY, OF BROOKLYN, NEW YORK, A CORPORATION OF NEW YORK.

SLITTING MEANS.

1,355,104.  Specification of Letters Patent.  Patented Oct. 5, 1920.

Original application filed October 1, 1918, Serial No. 256,447. Divided and this application filed June 9, 1920. Serial No. 387,619.

*To all whom it may concern:*

Be it known that we, JAMES A. CAMERON and GUSTAF B. BIRCH, citizens of the United States, and residents of the borough of Brooklyn, in the city of New York and State of New York and county of Kings, have invented certain new and useful Improvements in Slitting Means, of which the following is a specification.

This invention relates generally to slitting means, and more particularly to the type in which rotatable and overlapping shears are employed; the present application being a division of one filed October 1, 1918, Ser. No. 256,447.

The latter-day tendency, in slitting machines, is away from shear cutting devices and toward the so-called score cutting means exemplified in the construction shown in Patent No. 1076189 in which relatively blunt score cutters engage frictionally a cutter roll harder than the material of which the cutters are made. This tendency is due to the fact that by this means and by reason of surface rewinding means employed in connection therewith overlapping of the edges of adjacent rewound coils can be obviated to a very large extent because score cutters do not distort the severed web sections out of the plane of severance and because the surface rewinding means, which act to draw the web and the sections thereof through the machine, exert an equal longitudinal pull at all points laterally across the entire width of the web owing to the equal diameter of the rewound coils. For certain purposes, as when acting on paper having a very tough fiber, shear cutting means are preferable because a cleaner cut can be made thereby. The construction and location of the shear cutting means generally heretofore employed, however, have neutralized any possible advantage that might be obtained from their use; in consequence of which overlapping or interweaving of the edges of adjacent coils occurs. Most generally, a plurality of sets of overlapping shears, all being power driven, have been employed. With this construction it is necessary to maintain the diameter of all of the shears carried by the same shaft, or belonging to the same group, equal,—a limitation that it is almost impossible to meet in practice,—because, if this is not done then some of the shears, if they have a surface speed greater than the speed of the web, will overpull some of the web sections or move them faster than the rewinding device rolls up the web sections into coils; or, if the surface speed of the shears is less than the speed of the web, the paper in being pulled through the shears, will tear. In both instances, distortion of the slitted material occurs and proper rewinding is prevented. To overcome this difficulty resort has been had to a construction in which the shears are remotely located from the winding means, and, to physically separate the web sections before rewinding, separating means have been interposed between the slitting and rewinding devices. In such cases it has also been the custom to positively drive but one shear of each set, the other shear being driven frictionally from its companion. Such construction is complicated and expensive and overpulling and interweaving will occur in spite of the precautions taken.

The main object and feature of this invention is to equalize, regardless of their differences in diameter, the pull of the different sets of shears on the web sections so that overpulling and tearing of paper will not occur and the almost impossible task of keeping the parts nicely adjusted will be obviated. So also the slitting means may be located very close to the rewinding devices, a highly desirable feature because the more quickly the web sections are rewound the easier it is to control them; and expensive and complicated separating devices need not be employed.

Another object and feature of the invention resides in means whereby the overlapping shears of different sets may be quickly and easily separated and restored to active engagement without disturbing their adjustment or the frictional lateral relation of the shears.

Other objects and features will appear as the specification proceeds.

In the accompanying drawings the invention is disclosed in a concrete and preferred form in which:

Fig. 7 is a view looking in the direction of the arrow 7 of Fig 1.

Figure 1:
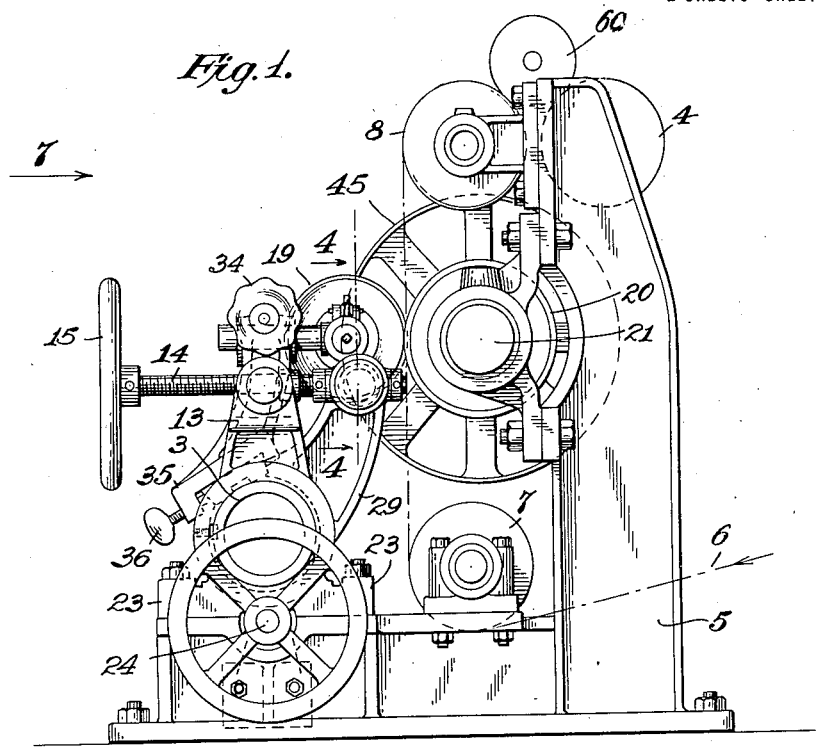
Figure 1 is an end elevation of slitting means embodying the invention.

The specific machine shown includes two main end frames 5 mounted on a suitable base and rigidly held in respect to each other. The web of paper 6 to be slitted is shown as passing over guiding rollers 7 and 8 mounted in the end frames, roller 8 being a rewinding drum which with drum 4 acts as a surface rewinding device for the coils 60 and also acts to draw the paper through the shears at a constant speed.

The means for slitting the paper comprises slitting members 19 and 20 in the form of overlapping rotatable shear cutters arranged in sets, one member of each set being carried by a positively driven shaft 21 rotatably mounted in the end frames and the other member of each set being carried by a rocking support 3 and driven by frictional engagement with its companion member. In effect therefore said slitting members are arranged in two groups, one member of each set being in one group on shaft 21 and the other member of each set being in the other group on rocking support 3 located below and in front of drum 8.

The rocking member or support 3 is suitably mounted at one end to move with the slide 22, the movement being in a direction parallel to the axis of said rocking member and is for the purpose of moving laterally and in unison the shear group composed of the frictionally driven members. Said slide moves in guides 23 and is actuated by means of threaded stem 24 rotating idly in said slide, and prevented from lengthwise displacement therein by means of collar 25 and shoulder 26, and in threaded engagement with bushing 27 carried by the guides 23. Check nuts 28 limit the movement in one direction so that slide 22 can always be returned to the same position. The other end of rocking member 3 slides in a bearing 23ª.

Means are provided for rocking the support 3 to move the frictionally driven group in unison edgewise with respect to the other group. A crank arm 13, carried by rocking support 3 is, at its outer end, internally threaded at right angles to the axis of said rocking support. Extending through the internally threaded portion of the crank arm is an externally threaded member 14 rotatable by means of handle 15. The unthreaded end 30 of the threaded member 14 is tiltably supported in bearing 31, said bearing having a shank 32 freely rotatable in extension 29 carried by slide 22. In this manner, when stem 14 is rotated, bearing 31 will prevent lengthwise displacement thereof while allowing idle rotation and tilting, and therefore crank arm 13 will be moved, carrying with it rocking support 3.

Figure 6:
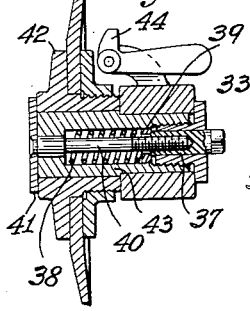
Fig. 6 is a sectional view on the line 6—6 of Fig. 2.
Figure 2:
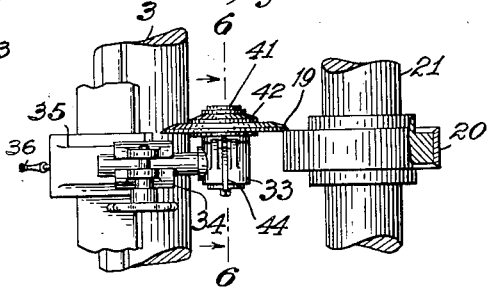
Fig. 2 is a top plan view of one set of slitting members partly in section.
Figure 5:
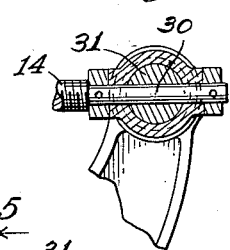
Fig. 5 is a sectional view on the line 5—5 of Fig. 4.
Figure 3:
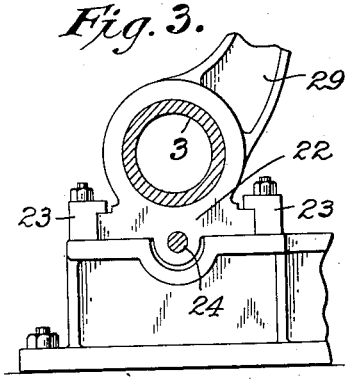
Fig. 3 is a sectional view on the line 3—3 of Fig. 7.
Figure 4:
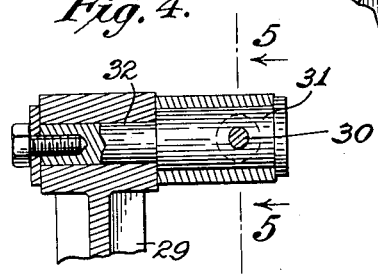
Fig. 4 is a sectional view on the line 4—4 of Fig. 1.

The particular construction of slitter 19 in this instance is as follows. A bushing 33 is supported in the clamp 34 so that the amount of overlap of the shears may be varied, said clamp being on the carrier 35 adjustably mounted by means of set screw 36 on rocking support 3, so that each cutter 19 can be individually adjusted laterally Bushing 33 contains a sliding member 37 normally moved to the right in Fig. 6 by means of spring 38 which bears against plate 39 that abuts 37. Sliding member 37 has a stem 40 connected with plate 41, and the latter is, in turn, connected to sleeve 42 that supports the cutter 19. Sleeve 42 slides on intermediate member 43 stationary with bushing 33. 44 is a cam pivotally supported on bushing 33 for acting against member 42 to move cutter 19 to the left in Fig. 6 against the action of the spring. Cutters 19 and 20 are therefore normally in overlapped engagement (Fig. 2) and spring 38 urges 19 toward 20.

By adjusting member 35 on support 3, the lateral tensional relation between the shears of each set may be varied independently of that of any other set and it will be understood that, after the frictionally driven group of shears is moved sidewise in unison, it can be restored as a group and the individual lateral relation of the shears of each set will then likewise be restored as will be understood from the following:

When it is desired to release the parts, slide 22 is moved sidewise by rotating stem 24; stem 14 is now rotated thereby turning rocking member 3 on its axis thereby bringing the cutters away from each other edgewise. When the parts are restored, check nuts 28 will insure that slide 22 is returned to its original position so that the requisite degree of pressure is exerted by 19 in overlapping engagement with 20. If desired, each cutter 19 may be moved sidewise out of engagement with its fellow by means of cam 44. Shears 20 are positively driven by any suitable means such as pulley 45 on shaft 21 and have a surface speed somewhat greater than the speed of the web. We have found, however, that, by frictionally driving shear 19, overpulling will not occur and the web sections may be rewound side by side into coils without interweaving. The shears are located in a very accessible position, viz: in front of and below the rewinding means with the frictionally driven shears outermost and the web sections have therefore a very short distance to travel before passing to the rewinding means.

We claim:

1. Slitting and rewinding means comprising: a set of rotatable and overlapping shears, one member of which is positively driven and the other driven by frictional lateral engagement with its companion, surface rewinding means for drawing at a constant speed a web of flexible material between said shears, means for driving said positively driven member at a slightly greater surface speed than the speed of movement of the web, and means for pressing said members together laterally to frictionally drive the other from the first member and to thereby prevent overpulling of the web by said first member.

2. Slitting and rewinding means comprising: a plurality of sets of rotatable and overlapping shears, one member of each set being positively driven and the other being driven by frictional lateral engagement with its companion, surface rewinding means for drawing at a constant speed a web of flexible material between said shears, and means for equalizing the pull of the different sets of shears, regardless of their differences in diameter, on the web sections, including: means for positively driving the driven member of each set at a slightly greater surface speed than the speed of movement of the web, and means for frictionally driving its companion by pressing it laterally against the positively driven member.

3. Slitting means comprising: a plurality of sets of overlapping shears composed of two opposed groups of rotatable members, the members of each set engaging laterally with each other under tension, a supporting shaft carrying the members of one group, means for adjusting the supporting shaft to move laterally and in unison all the members of one group, and means for varying, independently of that of any other set, the lateral relation of the members of each set by individually adjusting the members of the group on the shaft.

4. Slitting means comprising: a plurality of sets of overlapping shears composed of two groups of rotatable members, the members of each set engaging laterally with each other under tension, a supporting shaft carrying the members of one group, means for determining, independently of that of any other set, the amount of tension with which the members of each set shall engage laterally by individually adjusting the members of the group on the shaft and means for adjusting the supporting shaft to move laterally and in unison all the members of one group to separate the members of each set and to restore them to their previous lateral and tensional relation with respect to each other.

5. Slitting means comprising: a plurality of sets of overlapping shears composed of two groups of rotatable members, the members of each set engaging laterally with each other under tension, means for positively driving one group of members and thereby frictionally driving the other group from the first one, a supporting shaft carrying the members of one group, means for adjusting the supporting shaft to move laterally and in unison all the members of one group, and means for varying, independently of that of any other set, the lateral relation of the members of each set by individually adjusting the members of the group on the shaft.

6. Slitting means comprising: a plurality of sets of overlapping shears composed of two opposed groups of rotatable members, the members of each set engaging laterally with each other under tension, means for positively driving one group of members and thereby frictionally driving the other group from the first one, a supporting shaft carrying the members of the frictionally driven group, means for determining, independently of that of any other set, the amount of tension with which the members of each set shall engage laterally by individually adjusting the members of the frictionally driven group on the shaft, and means for adjusting the supporting shaft to move laterally and in unison all the members of the frictionally driven group to separate the members of each set and to restore them to their previous lateral and tensional relation with respect to each other.

7. Slitting means comprising: a plurality of sets of overlapping shears composed of two opposed groups of rotatable members, the members of each set engaging laterally with each other under tension, means for varying, independently of that of any other set, the lateral relation of the members of each set, means for moving laterally and in unison all the members of one group, to separate the members of each set laterally, and means for moving edgewise and in unison all the members of the laterally movable group.

8. Slitting means comprising: a plurality of sets of overlapping shears composed of two opposed groups of rotatable members, the members of each set engaging laterally with each other under tension, a supporting shaft carrying the members of one group, means for adjusting the supporting shaft to move laterally and in unison all the members of one group, and means for varying, independently of that of any other set, the lateral relation of the members of each set by individually adjusting the members of the group on the shaft, and means for varying, independently of that of any other set, the amount of overlapping of the members of each set.

9. Slitting means comprising: a plurality of sets of overlapping shears composed of two opposed groups of rotatable members, the members of each set engaging laterally with each other under tension, means for varying, independently of that of any other set, the lateral relation of the members of each set, means for moving laterally and in unison all the members of one group, to separate the members of each set laterally, means for moving edgewise and in unison all the members of the laterally movable group, and means for varying, independently of that of any other set, the amount of overlapping of the members of each set.

10. Slitting means comprising: a plurality of sets of overlapping shears composed of two opposed groups of rotatable members, the members of each set engaging laterally with each other under tension, means for determining, independently of that of any other set, the amount of tension with which the members of each set shall engage laterally, means for moving laterally and in unison all the members of one group to separate the members of each set and to restore them to their previous lateral engagement and tensional relation with respect to each other, and means for moving edgewise and in unison all the members of the laterally movable group.

11. Slitting means comprising: a plurality of sets of overlapping shears composed of two groups of rotatable members, the members of each set engaging laterally with each other under tension, a supporting shaft carrying the members of one group, means for determining, independently of that of any other set, the amount of tension with which the members of each set shall engage laterally by individually adjusting the members of the group on the shaft and means for adjusting the supporting shaft to move laterally and in unison all the members of one group to separate the members of each set and to restore them to their previous lateral and tensional relation with respect to each other, and means for varying, independently of that of any other set, the amount of overlapping of the members of each set.

12. Slitting means comprising: a plurality of sets of overlapping shears composed of two opposed groups of rotatable members, the members of each set engaging laterally with each other under tension, means for determining, independently of that of any other set, the amount of tension with which the members of each set shall engage laterally, means for moving laterally and in unison all the members of one group to separate the members of each set and to restore them to their previous lateral engagement and tensional relation with respect to each other, means for moving edgewise and in unison all the members of the laterally movable group, and means for varying, independently of that of any other set, the amount of overlapping of the members of each set.

13. Slitting means comprising: a plurality of sets of overlapping shears composed of two opposed groups of rotatable members, the members of each set engaging laterally with each other under tension, means for positively driving one group of members and thereby frictionally driving the other group from the first one, means for varying, independently of that of any other set, the lateral relation of the members of each set, means for moving laterally and in unison all the members of the frictionally driven group, to separate the members of each set laterally, and means for moving edgewise and in unison all the members of the frictionally driven group.

14. Slitting means comprising: a plurality of sets of overlapping shears composed of two groups of rotatable members, the members of each set engaging laterally with each other under tension, means for positively driving one group of members and thereby frictionally driving the other group from the first one, a supporting shaft carrying the members of one group, means for adjusting the supporting shaft to move laterally and in unison all the members of one group, and means for varying, independently of that of any other set, the lateral relation of the members of each set by individually adjusting the members of the group on the shaft, and means for varying, independently of that of any other set, the amount of overlapping of the members of each set.

15. Slitting means comprising: a plurality of sets of overlapping shears composed of two opposed groups of rotatable members, the members of each set engaging laterally with each other under tension, means for positively driving one group of members and thereby frictionally driving the other group from the first one, means for varying, independently of that of any other set, the lateral relation of the members of each set, means for moving laterally and in unison all the members of the frictionally driven group, to separate the members of each set laterally, means for moving edgewise and in unison all the members of the frictionally driven group, and means for varying, independently of that of any other set, the amount of overlapping of the members of each set.

16. Slitting means comprising: a plurality of sets of overlapping shears composed of two opposed groups of rotatable members, the members of each set engaging laterally with each other under tension, means for positively driving one group of members and thereby frictionally driving the other group from the first one, means for determining, independently of that of any other set, the amount of tension with which the members of each set shall engage laterally, means for moving laterally and in unison all the members of the frictionally driven group to separate the members of each set and to restore them to their previous lateral engagement and tensional relation with respect to each other, and means for moving edgewise and in unison all the members of the frictionally driven group.

17. Slitting means comprising: a plurality of sets of overlapping shears composed of two opposed groups of rotatable members, the members of each set engaging laterally with each other under tension, means for positively driving one group of members and thereby frictionally driving the other group from the first one, a supporting shaft carrying the members of the frictionally driven group, means for determining, independently of that of any other set, the amount of tension with which the members of each set shall engage laterally by individually adjusting the members of the frictionally driven group on the shaft, and means for adjusting the supporting shaft to move laterally and in unison all the members of the frictionally driven group to separate the members of each set and to restore them to their previous lateral and tensional relation with respect to each other, and means for varying, independently of that of any other set, the amount of overlapping of the members of each set.

18. Slitting means comprising: a plurality of sets of overlapping shears composed of two opposed groups of rotatable members, the members of each set engaging laterally with each other under tension, means for positively driving one group of members and thereby frictionally driving the other group from the first one, means for determining, independently of that of any other set, the amount of tension with which the members of each set shall engage laterally, means for moving laterally and in unison all the members of the frictionally driven group to separate the members of each set and to restore them to their previous lateral engagement and tensional relation with respect to each other, means for moving edgewise and in unison all the members of the frictionally driven group, and means for varying, independently of that of any other set, the amount of overlapping of the members of each set.

19. A slitting and rewinding machine comprising: surface rewinding means for advancing the web at a constant rate of speed and for rewinding the slitted web sections side by side, a plurality of sets of rotatable and overlapping shears, one member of each set being positively driven and the other driven by frictional engagement with its companion member, arranged adjacent the rewinding means, and means for preventing inter-weaving of adjacent rewound coils by equalizing, regardless of their differences in diameter, the pull of the different sets of shears on the web sections.

20. A slitting machine comprising: a web advancing roll, a plurality of sets of overlapping shears composed of two opposed groups of rotatable members, the members of each set engaging laterally with each other under tension, means for positively driving one group of members and thereby frictionally driving the other group, said groups located below the web advancing roll with the frictionally driven group outermost, means for moving in a direction parallel with the axis of the web-advancing roll and in unison all the members of the frictionally driven group, and means for moving edgewise and outwardly in unison all the members of the frictionally driven group.

21. A slitting machine comprising: a web advancing roll, a plurality of sets of overlapped shears composed of two groups of rotatable members, the members of each set engaging laterally with each other under tension, means for positively driving one group of members and thereby frictionally driving the other group, said groups located below the web advancing roll, means for moving in a direction parallel with the axis of the web advancing roll all the members of one of said groups, and means for moving edgewise and in unison all the members of one of said groups.

22. Slitting means comprising: a supporting shaft, a plurality of sets of slitting members, each set consisting of two rotatable overlapped members, one member of each set being carried by said supporting shaft, means for adjusting the supporting shaft in a direction parallel to the axes of rotation of said slitting members, means normally urging each member carried by the supporting shaft in a direction parallel to its axis of rotation toward its complementary member, and means for individually moving each of said members in a direction opposite to that in which it is normally urged.

23. Slitting means comprising: a support, a plurality of sets of slitting members, each set consisting of two rotatable overlapping members, one member of each set being carried by said support, means for adjusting the support in a direction parallel to the axes of rotation of said slitting members, and means for rocking the support.

24. Slitting means comprising: a support, a plurality of sets of slitting members, each set consisting of two rotatable overlapping members, one member of each set being carried by said support, means for adjusting the support in a direction parallel to the axes of rotation of said slitting members, means normally urging each member carried by the support in a direction parallel to its axis of rotation toward its complementary member, means for individually moving each of said members in a direction opposite to that in which it is normally urged, and means for rocking the support.

25. Slitting means comprising: two opposed groups of rotatable slitting members arranged in complementary overlapped sets, and means for separating the members of all the sets including devices for moving one group lengthwise with respect to the axes of rotation of the members thereof and for rocking said group edgewise with respect to the other group.

26. Slitting means comprising: a guide, a slide movable in said guide, an extension on said slide, a rocking support mounted in said slide and movable therewith, a slitting member on said rocking support, a second slitting member coöperating with the first member, a crank arm carried by the rocking support internally threaded at right angles to the axis of the latter, a threaded member in engagement with the threaded portion of the crank arm, and a bearing carried by the extension and tiltably supporting the threaded member and with which the latter has idle rotatable engagement.

27. Slitting means comprising: a guide, a slide movable in said guide, an extension on said slide, a rocking support mounted in said slide and movable therewith, a slitting member on said rocking support, a second slitting member coöperating with the first member, a crank arm carried by the rocking support internally threaded at right angles to the axis of the latter, a threaded member in engagement with the threaded portion of the crank arm, a bearing carried by the extension and tiltably supporting the threaded member and with which the latter has idle rotatable engagement, means normally urging each member carried by the support in a direction parallel to its axis of rotation toward its complementary member, and means for individually moving each of said members in the support in a direction opposite to that in which it is normally urged.

28. Slitting means comprising: a plurality of sets of slitting members, each set consisting of two rotatable overlapping slitting members, a rocking member carrying one of the slitting members of each set, means for individually urging each of the slitting members carried by the rocking member toward its fellow in a direction parallel to the axes of said slitting members, and means for adjusting the rocking member lengthwise of the axes of the slitting members.

29. Slitting means comprising: a rocking member mounted for axial adjustment, a plurality of sets of slitting members, each set consisting of two rotatable overlapping members, one member of each set being carried by said rocking member, and means for adjusting the rocking member in a direction parallel to the axis of rotation of said slitting members.

30. Slitting means comprising: a rocking member mounted for axial adjustment, a plurality of sets of slitting members, each set consisting of two rotatable overlapping members, slitter carriers mounted on the rocking member, one member of each of the sets of slitting members being mounted on one of said slitter carriers, and means for adjusting the rocking member in a direction parallel to the axis of rotation of said slitting members.

31. Slitting means comprising: a rocking member mounted for axial adjustment, slitter carriers mounted for longitudinal adjustment on said rocking member, rotatable overlapping slitting members arranged in sets of two, one member of each set being mounted on one of the slitter carriers, means for adjusting the rocking member in a direction parallel to the axis of the slitting members, and means for rocking the rocking member.

32. Slitting means comprising: a guide, a slide movable in said guide, a rocking member mounted at one end to move with said slide and slidably mounted at the other end, and a plurality of sets of slitting members, each set consisting of two rotatable overlapping members, one member of each set being carried by said rocking member.

Signed at the borough of Brooklyn, in the county of Kings, city and State of New York, this 5" day of June 1920.

JAMES A. CAMERON.
GUSTAF BIRGER BIRCH.